United States Patent [19]
Godwin, Sr.

[11] Patent Number: 4,514,131
[45] Date of Patent: Apr. 30, 1985

[54] AUTOMATIC SELF-LOCKING ROLL BACK CARRIER FOR A VEHICLE

[76] Inventor: James P. Godwin, Sr., Rte. 5, Box 8, Dunn, N.C. 28334

[21] Appl. No.: 456,568

[22] Filed: Jan. 10, 1983

[51] Int. Cl.$^3$ ............................................. B60P 1/00
[52] U.S. Cl. .................................. 414/480; 403/101; 298/38
[58] Field of Search ........................ 414/469, 477–480; 298/38, 12, 14, 22 R; 292/201, 302; 403/101, 102

[56] References Cited

U.S. PATENT DOCUMENTS

| 840,038 | 1/1907 | Baskins | 298/22 R |
|---|---|---|---|
| 1,670,232 | 5/1928 | Biszantz | 298/38 X |
| 2,621,814 | 12/1952 | Lisota | 298/12 UX |
| 2,708,047 | 5/1955 | Seidle | 414/477 |
| 3,159,294 | 12/1964 | Forsythe, Jr. | 414/478 |
| 3,198,363 | 8/1965 | Snead | 414/469 X |
| 3,204,796 | 9/1965 | Hand | 414/469 X |
| 3,450,282 | 6/1969 | Ezolt | 414/477 |
| 3,485,400 | 12/1969 | Pewthers | 414/477 |
| 4,249,851 | 2/1981 | Sedelmayer | 414/469 X |
| 4,318,658 | 3/1982 | McIntyre | 414/480 |

Primary Examiner—Robert J. Spar
Assistant Examiner—David A. Bucci
Attorney, Agent, or Firm—Mills & Coats

[57] ABSTRACT

The present invention relates to an automatic self-locking roll back carrier of the type that is adapted to be mounted on a vehicle. The roll back carrier includes a sub-frame and a lift frame pivotably mounted thereto. Movably mounted to the lift frame is a load bed. Operatively interconnected between the sub-frame and lift frame is a pair of hydraulic lift cylinders. Interposed between the hydraulic lift cylinders and lift frame is a locking bar assembly that is movably mounted between longitudinally spaced stops in the lift frame. Secured to the sub-frame and disposed adjacent the locking bar assembly when the lift frame is in a transport position is a locking structure. The locking structure is so positioned with respect to the position occupied by the locking bar assembly when the lift frame is in a transport position that the locking structure effectively overlies the locking bar assembly and locks the lift frame to the sub-frame. Actuation of the lift frame from a transport to a loading position results in the locking bar assembly traveling generally horizontally a predetermined distance such that it is no longer locked by the locking structure and is free to move up with the lift frame as the same is lifted by the lift cylinders.

3 Claims, 6 Drawing Figures

AUTOMATIC SELF-LOCKING ROLL BACK CARRIER FOR A VEHICLE

FIELD OF INVENTION

The present invention relates to carriers and more particularly to roll back carriers of the type adapted to be mounted on a vehicle and which includes a load bed tiltable from a generally horizontal transport position to an inclined loading position for conveniently receiving a load thereon.

BACKGROUND OF INVENTION

Roll back carriers are very common today. Essentially they comprise a sub-frame structure, a lift frame mounted to the sub-frame and a roll back load bed mounted on the lift frame. The sub-frame structure is designed to be mounted to the chassis of a vehicle such as a truck.

In operation the lift frame can be tilted with respect to the sub-frame and the load bed can then be rolled back to where the same engages the pavement, ground or other underlying support surface supporting the vehicle. In the rolled back position, the load bed assumes a convenient posture for loading.

Roll back carriers are commonly used to transport vehicles and especially disabled vehicles from one location to another. By using a winch, a vehicle can be pulled on the inclined load bed, after which the load bed is advanced forwardly by power means operatively interconnected between the lift frame and the load bed. After this the lift frame can be lowered downwardly to a generally horizontal transport position.

It is desirable, and in fact generally required by law, that the lift frame be securely locked to the sub-frame when the lift frame and load bed are disposed in horizontal transport positions. This obviously is a safety feature and prohibits the lift frame and load bed from inadvertently being tilted during transport and the load falling from the vehicle. The requirement of a locking mechanism for locking the lift frame to the sub-frame has been the source of a real problem with respect to roll back carriers for a long time. Often these designs have required that a latching mechanism or locking assembly be manually activated and deactivated. The result of this is that often the operator inadvertently forgets to complete the locking arrangement. Even more importantly, the operator may forget to unlock the lift frame from the sub-frame prior to actuating the hydraulic lift cylinders that raise the lift frame above the sub-frame. The latter case presents a real problem because of the potential for structural damage to the locking mechanism and the roll back carrier in general.

Therefore, there is a need for an automatic self-locking mechanism for securely locking the lift frame of a roll back carrier to the sub-frame once the lift frame assumes a generally horizontal transport position.

SUMMARY AND OBJECTS OF THE INVENTION

The present invention entails a roll back carrier that is provided with an automatic locking system for locking the lift frame to the sub-frame of the roll back carrier when the lift frame assumes a generally horizontal transport position. Further, the present automatic self-locking system is integrated into the lift mechanism for the lift frame.

In this regard, the roll back carrier includes lift cylinder means anchored and interconnected between the sub-frame of the roll back carrier and the lift frame. In the present design, the lift cylinders are connected to a locking bar that is slidably contained within the frame structure of the lift frame. The locking bar assembly is movable back and forth between forwardly and rearwardly spaced stops formed in the frame structure of the lift frame. The sub-frame, on the other hand, includes a pair of latching hooks. The roll back carrier is designed such that in actuating the lift cylinder to raise the lift frame from a transport to a loading position, the locking bar travels out of engagement with the locking hooks and then effectively engages the rearmost stops associated with the lift frame. After the locking bar engages the rearmost stops of lift frame, the continuing extension of the lift cylinders results in the lift frame being tilted to its loading position. As the lift frame is lowered to the transport position, the locking bar will effectively lower the lift frame down until it rests on the sub-frame so as to assume a transport position. After the lift frame assumes the transport position, the lift cylinders continue to retract and move forwardly the locking bar assembly. The locking bar assembly is moved forwardly until it underlies the pair of locking hooks formed on the main frame structure. Since the locking bar is confined within the rails of the lift frame and is further confined by the locking hooks, it is appreciated that the lift frame is effectively locked to the sub-frame.

In addition the present invention provides a plurality of longitudinally spaced rollers on each of the sub-frame channels of the lift frame. The rollers are mounted such that upper portion thereof extend above the upper or top level of the lift frame. The load bed is in turn supported directly on the rollers of the lift frame. This enables the load bed to easily roll back and forth between its transport and inclined loading positions.

It is, therefore, an object of the present invention to provide a roll back carrier for a vehicle that is provided with an automatic locking mechanism for locking the lift frame and load bed to the sub-frame when the lift frame and load bed are disposed in a generally horizontal transport position.

A further object of the present invention resides in an automatic self-locking system for locking the load bed and lift frame of a roll back carrier to the sub-frame structure wherein the locking mechanism is designed such that it automatically locks during an appropriate phase of the actuation of the lift frame and load bed carried by said lift frame.

Another object of the present invention resides in the provision of a roll back carrier of the character referred to above wherein the lift frame and load bed assume a locked position automatically when in the transport position and wherein this locked position is automatically achieved during the lowering of the lift frame and load bed to its generally horizontal transport position.

Other objects and advantages of the present invention will become apparent from a study of the following description and the accompanying drawings which are merely illustrative of such invention.

ROLL BACK CARRIER

Figure 1:
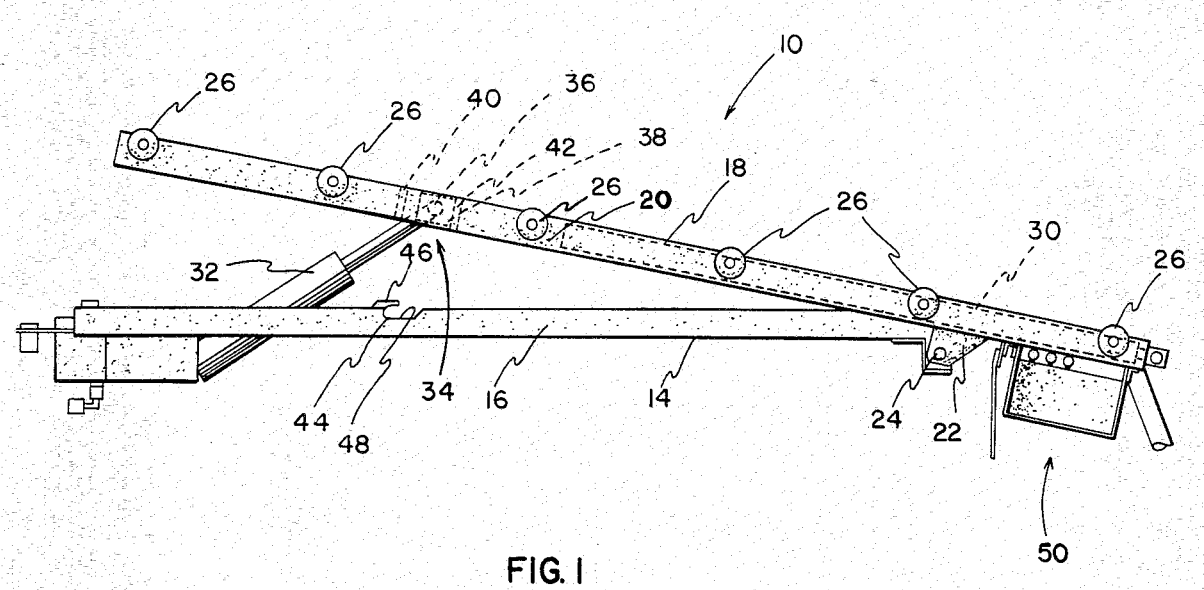
FIG. 1 is a side elevational view of the sub-frame and lift frame of the roll back carrier of the present invention.
Figure 2:
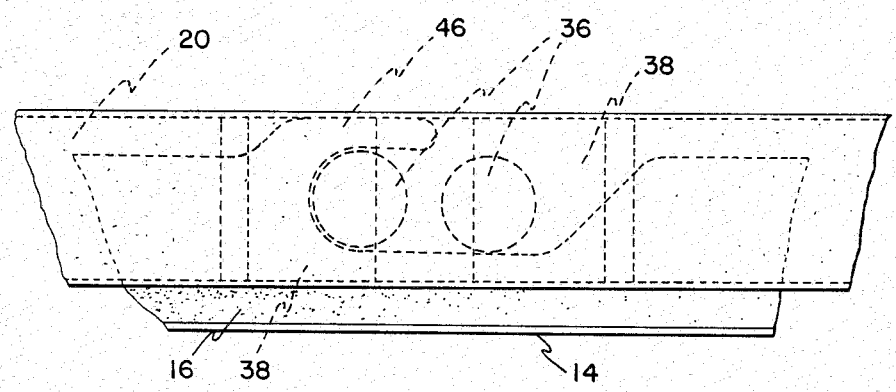
FIG. 2 is a fragmentary side elevational view that main frame the manner of locking the lift frame to the sub-frame of the roll back carrier.
Figure 3:
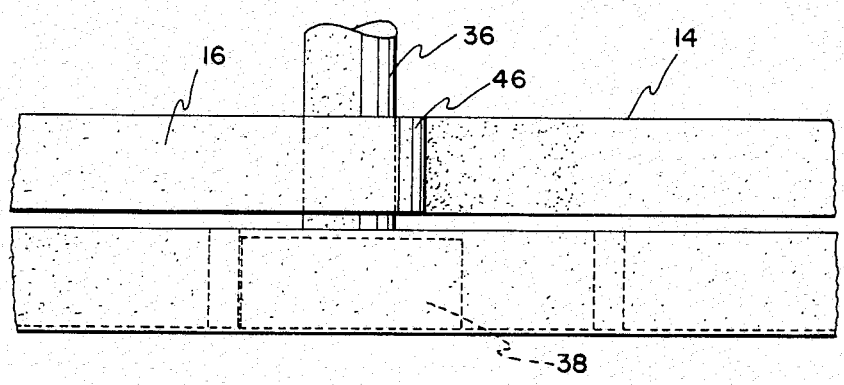
FIG. 3 is a fragmentary plan view of the automatic locking mechanism of the roll back carrier of the present invention.

With further reference to the drawings, the roll back carrier of the present invention is shown therein and indicated generally by the numeral 10. Roll back carrier 10 is designed to be mounted to chassis 12 of a vehicle such as a truck and is used to carry loads such as vehicles from one location to another. A complete understanding of the structure and operation of the roll back carrier 10 of the present invention will be more fully understood from the subsequent disclosure.

Referring to roll back carrier 10 in more detail, it is seen that the same includes a sub-frame structure 14 that is mounted directed to chassis 12 of the vehicle or truck shown in the drawings. Sub-frame structure 14 includes two elongated laterally spaced side frame members 16 with appropriate interconnecting structure.

Figure 4:
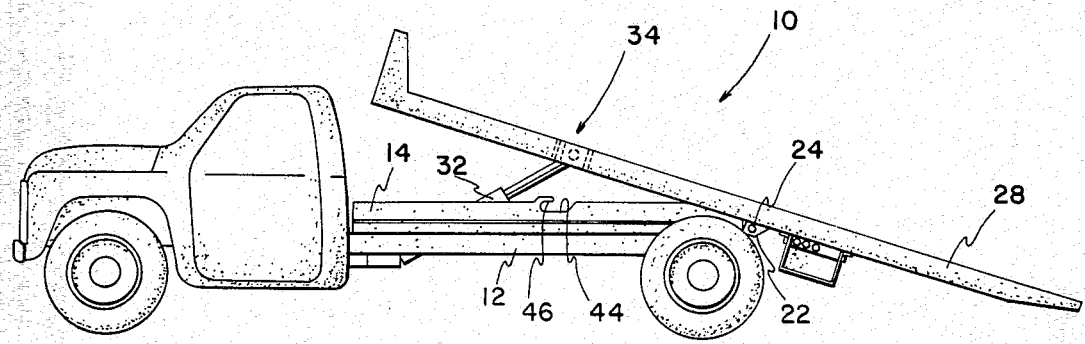
FIG. 4 is a side elevational view of the roll back carrier of the present invention mounted on a vehicle and with the lift frame thereof being disposed in an inclined position.
Figure 5:
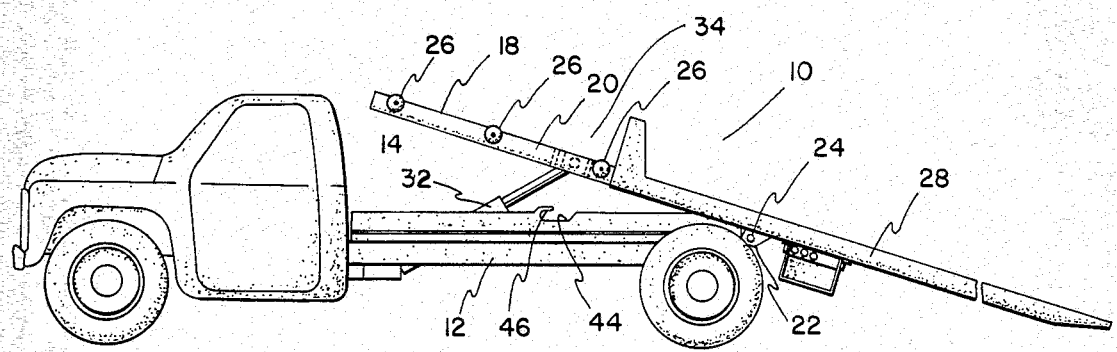
FIG. 5 is a side elevational view of the roll back carrier as shown in FIG. 4 but with the load bed extending rearwardly to a loading position.
Figure 6:
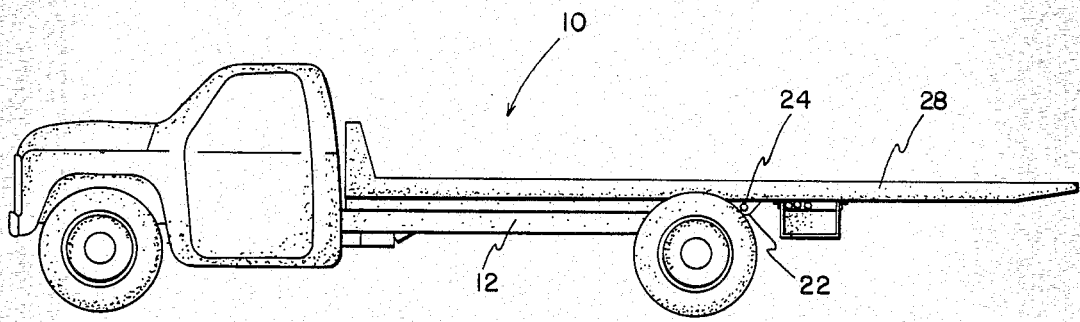
FIG. 6 is a view similar to FIGS. 4 and 5 but with the roll back carrier disposed in a horizontal transport position.

Pivotably mounted to sub-frame structure 14 is a lift frame 18. Lift frame 18 includes two elongated laterally spaced channel members 20 that are also appropriately interconnected to form a rigid lift frame structure. Secured to a rear portion of the lift frame 18 is a pair of plates or gussets 22. Gussets 22 are pivotably connected to the sub-frame structure 14 through a transverse pivot shaft 24. Therefore, it is appreciated that the entire lift frame 18 is pivotably mounted for movement about sub-frame structure 14 from a horizontal transport position (FIG. 6 to an inclined loading position (FIG. 4).

Rotatively mounted to the outside of each channel member 20 of lift frame 18 is a series of longitudinally spaced rollers 26. Mounted on the lift frame 18 and supported over rollers 26 is a load bed 28. As will be appreciated from subsequent portions of this disclosure, the load bed 28 is movable from a forward transport position to a rearward loading position. In the rearward loading position, lift frame 18 will assume its loading position and the rear portion of load bed 28 will actually extend rearwardly to where it engages the ground or other supports surface underlying the vehicle carrying roll back carrier 10.

To power load bed 28, there is provided hydraulic cylinder means 30 anchored within lift frame 18 and operatively connected to load bed 28. It is appreciated that actuation of hydraulic cylinder 30 would be operative to move the load bed back and forth between the rearward loading position and the forward transport position.

To tilt lift frame 18 with respect to sub-frame 14, there is provided hydraulic lift cylinder means 32. Lift cylinder means 32 in one contemplated embodiment would comprise two hydraulic cylinders anchored to the sub-frame structure 14, as indicated in the drawings, and which extends therefrom to where the rod ends thereof are operatively associated with lift frame 18.

The present invention entails an automatic latching or locking assembly, indicated generally by the numeral 34, that is designed to automatically lock lift frame 18 to sub-frame 14 when lift frame 18 assumes a generally horizontal transport position. In particular, locking assembly 34 includes a locking bar 36 that extends between opposite plates 38. Plates 38 are confined within the respective channel members 20 of lift frame 18. Plates 38 and the interconnecting locking bar 36 are confined within the lift frame 18 for limited movement between stops provided in each respective channel member 20 of lift frame 18. Each plate 18 is restricted for movement between a forward stop 40 and a rearward stop 42.

Formed about sub-frame 14 in the adjacent vicinity of the locking bar 36 when the lift frame 18 assumes the transport position, is a cutout 44 that is formed in each elongated side member 16 of the sub-frame 14. Disposed rearwardly of the cutouts 44 is a pair of hook-shaped locking arms 46. Defined below the hook-shaped locking arms 46 is a bar receiving area indicated by the numeral 48.

The respective rods of the lift cylinder means 32 are connected to locking bar 36. From the drawings, it is seen that when lift frame 18 is in the horizontal transport position, that locking bar 36 underlies the hook-shaped locking arms 46.

In the horizontal transport position, the respective plates 38 of the locking assembly 34 are disposed in their forwardmost position abutting forward stops 40. The extension of the rods of hydraulic cylinders 32 causes the plates 38 of the locking assembly 34 to move rearwardly in the channels 20 of lift frame 18. The initial movement of the plates 38 and the interconnecting bar 36 does not affect the attitude of lift frame 18 as it remains stationary adjacent sub-frame 14. But the movement of plates 38 during the initial actuation of lift cylinder means 32 results in locking bar 36 being moved rearwardly out from underneath the confines of the hook-shaped locking arms 46. Plates 38 continue to move rearwardly until they engage rearmost stop 42. When rearmost stops 42 are engaged by plates 38, the locking bar 36 has cleared the hook-shaped locking arms 46. After plates 38 engage rearmost stops 42, any further extension of the rods of hydraulic lift cylinder means 32 results in lift frame 18 being tilted clockwise as viewed in FIG. 1 about transverse pivot shaft 24.

To lower lift frame 18, hydraulic cylinder means 32 is actuated so as to retract the rods thereof. The retraction of the rods results in lift frame 18 being pivoted counterclockwise (FIG. 1) and towards sub-frame 14. In lowering lift frame 18 onto sub-frame 14, lift frame 18 will rest adjacent sub-frame 14 just before plates 38 separate from rearmost stops 42 and begin to move forwardly. At this point, it is appreciated that the area above cutouts 44 is unobstructed and that locking bar 36 will then move directly rearwardly into the locking bar receiving area 48. The continued retraction of the rods of cylinder 32 will result in plates 38 moving towards forward stops 40. Once plates 38 have moved adjacent forward stops 40, locking bar 36 will underlie the hook-shaped locking arms 46 of the sub-frame 14. This effectively locks lift frame 18 to sub-frame 14. As appreciated from the above-referred to discussion, this locking process is automatic inasmuch as it is accomplished while the lift frame 18 is returned to its generally horizontal transport position.

From the above discussion, it is appreciated that the various hydraulic cylinders referred to would be operatively associated with control valves and hydraulic plumbing for controlling the actuation of the same. Such controls and plumbing are not discussed herein in detail because such is not per se material to the present invention and because control valves and hydraulic systems of the type utilized in the present invention are commonly used in commercial applications today. It will be seen that a hydraulic control center is provided about the rear of the roll back carrier 10 and is indicated therein generally by the numeral 56.

From the foregoing discussion it is appreciated that the present invention presents an automatic latching system for a roll back carrier wherein the lift frame is automatically locked to the sub-frame 14 while the same is being moved between its loading and horizontal positions. There is no requirement for a locking pin to be inserted and removed as the locking process is entirely automatic. Further, the locking system of the present invention is reliable, relatively simple, and easy to manufacture and incorporate into a roll back carrier design.

The terms "upper", "lower", "forward", "rearward", etc., have been used herein merely for the convenience of the foregoing specification and in the appended Claims to describe the roll back carrier and its parts as oriented in the drawings. It is to be understood, however, that these terms are in no way limiting to the invention since the roll back carrier may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An automatic self-locking roll back tiltable load carrier adapted to be mounted on a vehicle comprising:
   A. a sub-frame structure;
   B. a lift frame movably mounted to said sub-frame structure and movable between a generally horizontal transport position and an inclined loading position;
   C. means associated with said lift frame and said sub-frame structure for moving said lift frame between said transport and loading position;
   D. a load bed movably mounted on said lift frame and movable back and forth thereon from a transport position to a loading position wherein in said loading position said load bed extends to a surface underlying and supporting the vehicle having said roll back carrier mounted thereon whereby a load such as a vehicle can be conveniently moved onto said load bed;
   E. means for moving said load bed between said transport and loading positions;
   F. a latching assembly operatively associated with said sub-frame structure and said lift frame for locking said lift frame to said sub-frame structure when said lift frame is disposed in the transport position, said latching assembly including a latch structure secured to said sub-frame structure; a locking bar assembly movably mounted within said lift frame and movable between a locked position in which case said locking bar assembly is engaged with said latch structure and a lifting position, said locking bar assembly comprising an elongated locking bar with a pair of laterally spaced lifting plates secured thereto with said locking bar and lifting plates being movable together within said lifting frame between said locked and lifting positions; a pair of laterally spaced lifting stops secured to said lift frame and disposed in the path of travel of said lifting plates as the same are moved between said locked and lifting positions with said lifting stops being spaced from said lifting plates when the locking bar assembly assumes said locked position and wherein said lifting stops actually engage said lifting plates when said locking bar assembly assumes said lifting position; and a locking and lifting hydraulic cylinder interconnected between said sub-frame and said locking bar for moving said locking bar assembly from said locked position to said lifting position wherein in the lifting position said lifting plates of said locking bar assembly actually engage said lifting stops on said lift frame for continuing to move said locking bar and the lifting plates thereof against said lifting stops to raise said lift frame from said horizontal transport position to said inclined loading position, said locking and lifting hydraulic cylinder further functioning to both lower said lift frame and to lock the same to said sub-frame via said latching assembly by moving said locking bar back downwardly towards said sub-frame where said lifting plates separate from said lifting stops in response to said lift frame reaching its horizontal transport position and being supported by said sub-frame after which said transverse locking bar is pulled into a locked position within said latch structure secured to said sub-frame by said same hydraulic cylinder, whereby said hydraulic cylinder functions to both lock and unlock said lift frame to said sub-frame and to raise and lower said lift frame relative to said sub-frame.

2. The automatic self-locking roll back tiltable load carrier of claim 1 wherein said lift frame includes two laterally spaced channels and wherein said lifting plates are movably confined within said channels of said lift frame and wherein said lifting stops are mounted in said channels.

3. The automatic self-locking tiltable load carrier of claim 2 wherein said lift frame structure includes a plurality of roller supports secured to the same, said roller supports including an upper portion that extends above the general level of said lift frame structure wherein said load bed is disposed on said upper portion of said roller supports and movable thereacross between said transport and loading position.

* * * * *